UNITED STATES PATENT OFFICE.

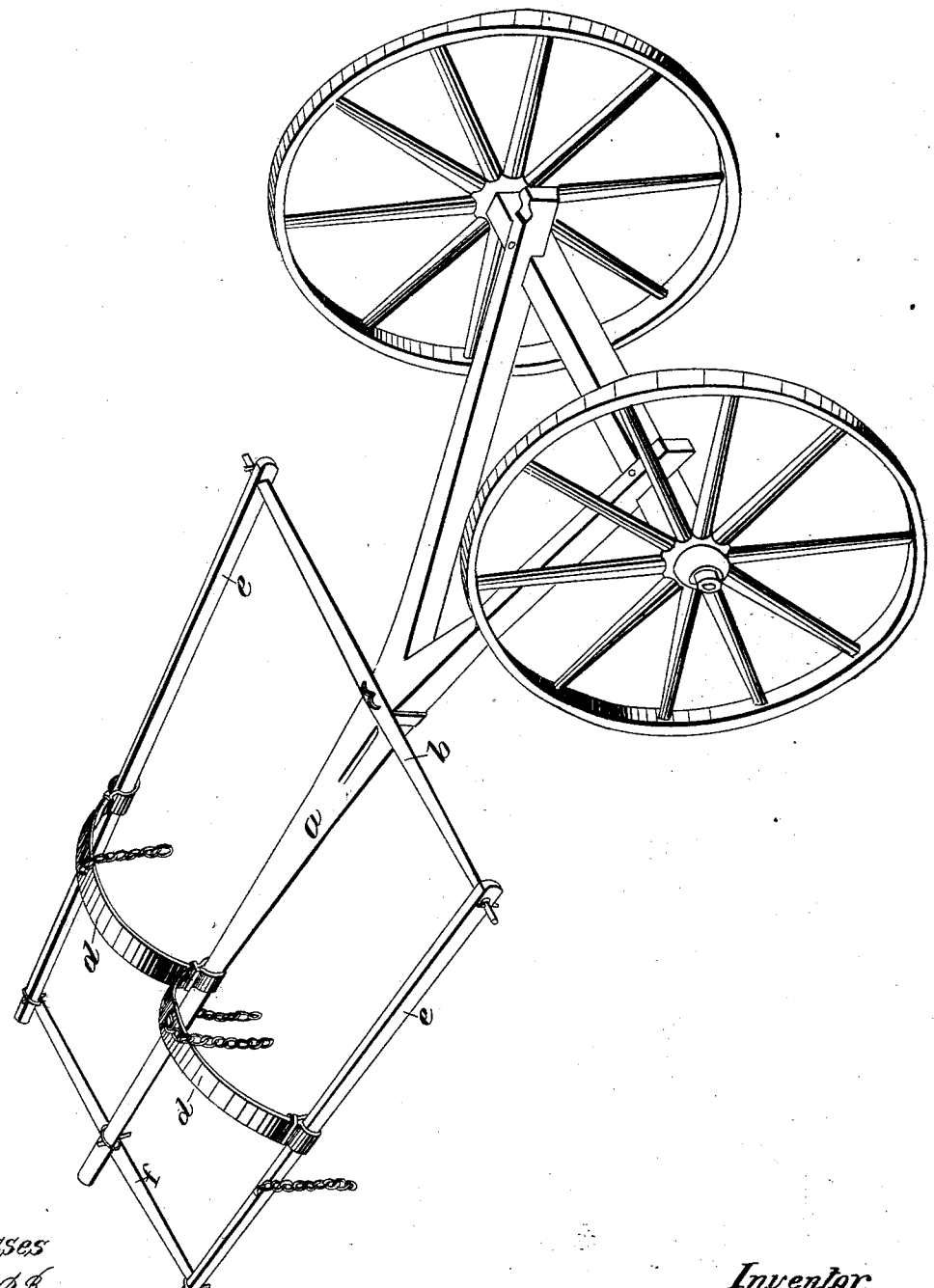

J. W. BARNES, OF MURFREESBORO, NORTH CAROLINA.

ATTACHING HORSES, &c., TO TWO-WHEELED VEHICLES.

Specification of Letters Patent No. 30,455, dated October 23, 1860.

*To all whom it may concern:*

Be it known that I, J. W. BARNES, of Murfreesboro, in the county of Hertford and State of North Carolina, have invented an Improvement in Equalizing the Burden and Draft of Horses in Carriages; and I do hereby declare that the following is a full, clear, and exact description of the principle or character which distinguishes it from all other things before known and of the usual manner of making, modifying, and using the same, reference being had to the accompanying drawings, representing the carriage in perspective.

My invention consists in a certain combination of parts whereby I am enabled to equalize the burden and draft of carriage horses described as follows, $a$ represents the tongue of a carriage; $b$, the swingle tree; $e, e$, side shafts; $f$ the fore bar and $d, d$, back straps made so as to vary their lengths to suit horses of different heights. The side shafts are connected with the swingle tree and fore bar by loose joints, and the fore bar itself is loosely jointed to the pole, so that all the sides of the frame may be drawn out of their rectangular position shown in the drawing, the sides still preserving their parallelism, one side shaft $e$, being in advance of the other, and so that the whole frame may rock on the tongue.

When the horses are harnessed under the back straps, if one should move faster than the other, his side of the frame is carried forward and the other back, and it is obvious that through the swingle tree and fore bar the draft of the horses on the pole must be equalized, and by means of the back straps connected with the pole and side bars and the rocking of the frame on the pole, the burden sustained by the horses will be equalized.

The fore bar or breast tree performs an important part in equalizing the burden as will be seen at once by removing the fore bar, when the load is on the horses. The result will be that the tongue or pole will drop and the side bars fly up and the horses forced together.

This improvement is only adapted to the two-wheel cart, where the load comes upon the horse's back, and the invention may be stated as a mode of attaching horses to two wheel carts.

I do not claim the employment of side shafts or thills attached to the body of a carriage in combination with a pole, but,

What I claim as my improvement in attaching two horses to two wheel carriages is—

The combination of the fore bar or breast tree $f$, the side bars or shafts $e, e$, and swingle tree $b$, with the pole or tongue of a two wheel cart or carriage in the manner and for the purposes herein set forth.

J. W. BARNES.

Witnesses:
 Jos. D. BARNES,
 J. W. HILL.